US012185881B2

(12) United States Patent
Smith, Jr.

(10) Patent No.: US 12,185,881 B2
(45) Date of Patent: Jan. 7, 2025

(54) TOILET PLUG (71) Applicant: William Penfield Smith, Jr., Adairsville, GA (US)

(72) Inventor: William Penfield Smith, Jr., Adairsville, GA (US)

( * ) Notice: Subject to any disclaimer, the term of this patent is extended or adjusted under 35 U.S.C. 154(b) by 169 days.

(21) Appl. No.: 17/714,479

(22) Filed: Apr. 6, 2022

(65) Prior Publication Data

US 2022/0313034 A1 Oct. 6, 2022

Related U.S. Application Data

(60) Provisional application No. 63/171,414, filed on Apr. 6, 2021.

(51) Int. Cl.
*A47K 17/00* (2006.01)
*A47K 11/02* (2006.01)
*F16L 55/11* (2006.01)

(52) U.S. Cl.
CPC ............. *A47K 17/00* (2013.01); *A47K 11/02* (2013.01); *F16L 55/1141* (2013.01)

(58) Field of Classification Search
CPC .. A47K 11/02; F16L 55/1141; F16L 55/1286; F16L 55/134; A63B 43/02; A63B 41/125
See application file for complete search history.

(56) References Cited

U.S. PATENT DOCUMENTS

| | | | |
|---|---|---|---|
| 495,064 A | | 4/1893 | Schrader |
| 4,565,222 A | * | 1/1986 | Lundman ................. F16K 7/10 138/40 |
| 5,485,637 A | * | 1/1996 | Green .................... A47K 11/02 134/183 |
| 5,503,188 A | * | 4/1996 | Petrone ................. F16L 55/124 138/121 |
| 5,619,757 A | | 4/1997 | Baratta |
| 6,240,576 B1 | * | 6/2001 | Cosby .................... A47K 11/02 4/476 |
| 2007/0275832 A1 | * | 11/2007 | Goldman ........... A63B 21/0004 482/77 |
| 2009/0276949 A1 | * | 11/2009 | Han ....................... A47K 11/02 4/449 |

FOREIGN PATENT DOCUMENTS

| | | |
|---|---|---|
| CN | 104594664 | 8/2016 |
| CN | 106400915 | 11/2018 |
| EP | 0855199 A2 * | 7/1998 |

(Continued)

OTHER PUBLICATIONS

Advameg, Inc.; Article entitled: "Portable Toilet", available at <www.madehow.com/Volume-3/Portable-Toilet.html>, accessed on Jan. 8, 2021, 5 pgs.

(Continued)

*Primary Examiner* — Janie M Loeppke
(74) *Attorney, Agent, or Firm* — Buchalter (57) ABSTRACT

A method can include inserting an inflatable body into an opening of a portable toilet; inflating the body by passing air through a valve and into the body, the valve secured to the body and defining a hole in the body; sealably engaging the plug with the opening; and transporting the portable toilet with the portable toilet in a filled condition.

11 Claims, 11 Drawing Sheets

(56) References Cited

FOREIGN PATENT DOCUMENTS

| | | |
|---|---|---|
| EP | 1489240 | 12/2004 |
| GB | 2383343 | 10/2005 |
| GB | 2459247 | 10/2009 |
| IN | 111677070 | 9/2020 |
| WO | 2007096631 | 8/2007 |

OTHER PUBLICATIONS

Exit15; Article entitled: "Hedstrom Green 15 Hopper Ball", located at <https://www.exit15.com/hedstrom-green-15-hopper-ball?language=en&currency=USD>, accessed on Feb. 16, 2021, 5 pgs.
Tractor Supply Co; Article entitled: "Jolly Ball", located at <https://www.tractorsupply.com/tsc/product/jolly-ball-jolly-mega-ball-30-in?cm_vc =- 10011>, available as early as Jan. 14, 2021, 5 pgs.
Tractor Supply Co; Article entitled: "Weaver Leather—Stacy Westfall Activity Ball, Purple, Small", located at <https://www.tractorsupply.com/tsc/product/weaver-leather-stacy-westfall-activity-ball-purple-small?cm_vc =-10005>, available as early as Jan. 14, 2021, 4 pgs.
Wikipedia; Article entitled: "Portable toilet", available at <https://en.wikipedia.org/wiki/Portable_toilet>, accessed on Feb. 15, 2021, 4 pgs.

* cited by examiner

TOILET PLUG

REFERENCE TO RELATED APPLICATIONS

This application claims the benefit of U.S. Provisional Application No. 63/171,414, filed Apr. 6, 2021, which is hereby specifically incorporated by reference herein in its entirety.

TECHNICAL FIELD

Field of Use

This disclosure relates to portable toilets and, more specifically, chemical toilets. More specifically, this disclosure relates to a plug for sealing main openings of such toilets during transportation of same.

Related Art

Chemical toilets, part of a larger and more general category of portable toilets, make it possible for users to relieve themselves where a lack of plumbing would otherwise make such relief difficult or, at least, immodest. Construction workers, participants in large festivals and other outdoor events, people in developing countries, and anyone otherwise not having ready access to restroom facilities can find a portable toilet useful. When the portable toilet reaches its capacity for waste materials or at some other interval, the portable toilet can be emptied and its use can be continued. Both "charging" and emptying of the toilet, however, typically can require a multi-step process necessitated by the fact that the toilet cannot be transported from one location (e.g., a storage site) to another location (e.g., a customer worksite) except in an empty state. Transport of a typical toilet in a filled state or condition, if attempted, can soil and contaminate an inside of the toilet or even leak out of the toilet during transport.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a device for sealably plugging an opening of a portable toilet, the device comprising: an inflatable body comprising an elastic material, the body sized to be received within and seal the opening of the portable toilet, the opening configured to receive and pass waste from a user; and a valve secured to the body and defining a hole in the body, the valve configured to facilitate inflation and deflation of the body by addition and removal of a gas.

In a further aspect, disclosed is a system comprising: a toilet defining an opening configured to receive waste from a user; an inflatable body comprising an elastic material, the body received within and sealably positioned inside the opening of the toilet; and a valve secured to the body and defining a hole in the body, the valve configured to facilitate inflation and deflation of the body.

In yet another aspect, disclosed is a method of using a toilet plug, the method comprising: inserting an inflatable body of the toilet plug into an opening of a portable toilet; inflating the body through a valve of the toilet plug; sealably engaging the opening with the plug; and transporting the portable toilet with the portable toilet in a non-empty condition.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the portable toilet—or a toilet plug disclosed herein—nearest to and occupied by a door of the toilet; "rear" is that end of the toilet that is opposite or distal the front; "left" is that which is to the left of or facing left from a person facing the outside front of the toilet; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a toilet plug and associated methods, systems, devices, and various apparatuses are disclosed herein. In one aspect, the toilet plug can comprise an inflatable body and a valve.

Figure 1:
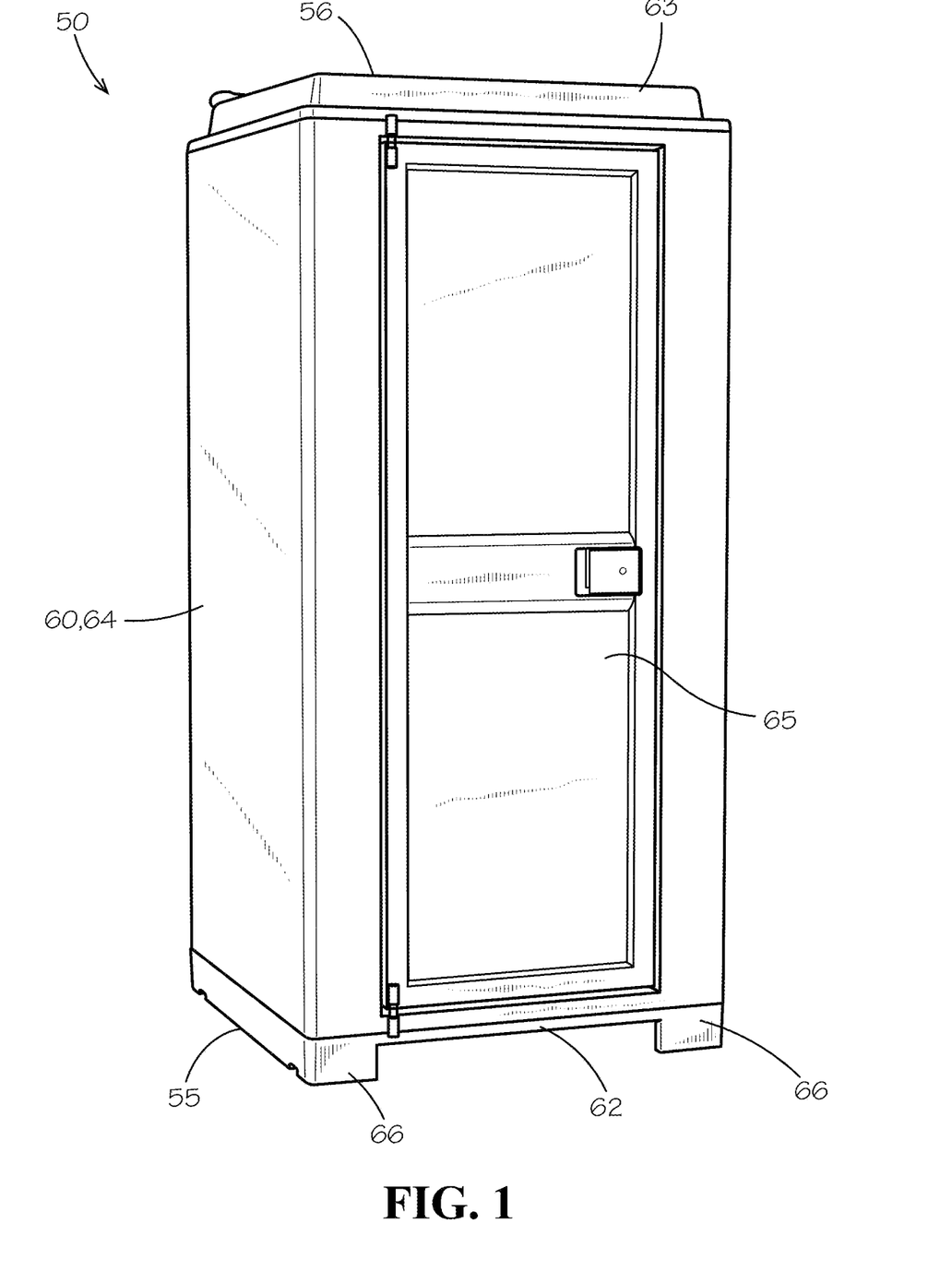
FIG. 1 is a perspective view of a portable toilet in accordance with one aspect of the current disclosure.

FIG. 1 is a perspective view of a toilet 50, which can be a portable toilet, in accordance with one aspect of the current disclosure. The toilet 50 can comprise an enclosure 60 and can define a bottom end 55 and a top end 56. The enclosure 60 can define a floor or bottom panel 62 at or near the bottom end 55, a ceiling or top panel 63 at or near the top end 56, and one or more side walls 64 extending from the bottom panel 62 to the top panel 63. The bottom panel can comprise skids 66, which can define an opening therebetween to facilitate, for example and without limitation, transport of the toilet 50 and/or positioning of the toilet 50 on uneven ground. The enclosure 60 can further comprise a door 65, which can be lockably secured to one of the one or more side walls 64 and can rotate with respect to the one of the one or more side walls 64 between a closed position shown in an open position (shown in FIG. 2). In some aspects, the toilet 50 can be non-portable—at least with respect to the structure in which it is installed—but moving such as the toilet in a recreational vehicle or in another moving vehicle such as a passenger airplane.

Figure 2:
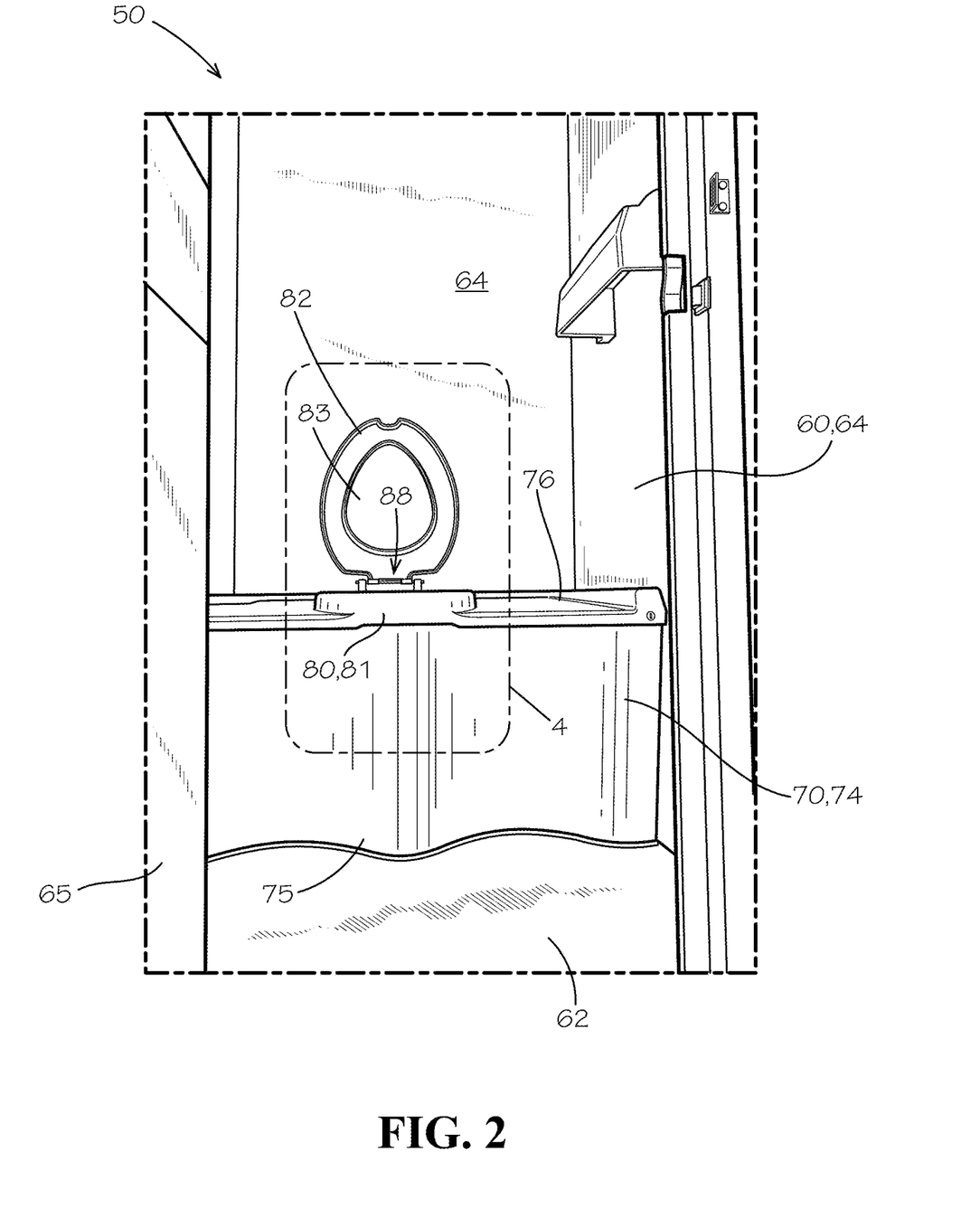
FIG. 2 is a front perspective view of the portable toilet of FIG. 1 with a door of the portable toilet in an open position.

FIG. 2 is a front perspective view of the toilet 50 of FIG. 1 with the door 65 of the toilet 50 in the open position. The toilet 50 can comprise a tank portion or tank 70 and a seat portion or seat 80. In some aspects, as shown, the seat 80 can define a top end 76 of the tank 70. The tank can define one or more side walls 74 extending from a bottom end 75 to the top end 76. The toilet 50 and, more specifically, the seat 80 can define a seat rim 82 and a seat cover 83, each of which can be secured to a stationary or main portion 81 of the seat 80 and can rotate with respect to the main portion 81. The toilet 50 and, more specifically, the seat 80 can further define an opening 88, through which excrement or excreta from a user can pass. The opening 88 can be a main opening or a secondary opening. In some aspects, the seat 80 can be configured to receive a body of a sitting user of the portable toilet; In some aspects, the opening 88, whether a main opening or a secondary opening, can define a passage for waste that need not receive the body of the sitting user. Instead, the opening 88 can in, for example and without limitation, the form of a urinal receive and allow passage of liquid waste without the user sitting on the seat 80. The toilet can define more than one opening 88.

The toilet 50 can be a chemical toilet, which can be a toilet that uses one or more chemicals that, together in solution, receive and react with the waste to minimize the resulting odors. For example and without limitation, the one or more chemicals can minimize the odors by masking them or by using biocides to keep odor-causing bacteria from multiplying. Each of the one or more chemicals can be a disinfectant "charge," and after use the solution in the toilet 50 can comprise both the charge and waste and can be together be a waste solution or a waste material.

As a logistical matter, as described above, the toilet 50 must usually if not always be transported in an empty condition (i.e., without the aforementioned one or more chemicals) to the customer location and then transported back from the customer location in an empty condition (i.e., without either the one or more chemicals or waste from users). Transport in such conditions is typically necessary because there exists no way to prevent the one or more chemicals, with or without the waste, from escaping the tank 70 and out of the opening 88 to undesirably soil and/or contaminate portions of the inside of the toilet 50 and/or leak out of the toilet 50. The result is that each toilet 50 typically can require four round-trips of a worker or work crew driving a variety of special trucks: a first trip to transport, unload, and position the empty toilet 50 using a special first truck (often but not necessarily configured to transport multiple toilets 50); a second trip to "charge" the toilet 50 at the customer location with the one or more chemicals using a special second truck for transporting, holding, and dispensing the chemical solution; a third trip to draw the waste solution from the toilet 50 at the customer location and into a special third truck for receiving, holding, and transporting the waste solution; and a fourth trip to move, load, and transport the toilet 50 from the customer location.

By using a toilet plug 600 disclosed herein (e.g., in FIG. 6A) to seal against leaking at the opening 88 during transport of the toilet 50, at least one or more of the aforementioned trips can be avoided including, for example, the second trip to charge the toilet 50 at the customer location and the third trip to draw the waste solution from the toilet 50 at the customer location. The one or more trips can be avoided by transporting the toilet 50 in a non-empty state or condition, e.g., while it is filled with chemicals and/or waste. Morever, as disclosed, the plug 600 can be a very simple design with few or no moving parts and at low cost can be configured to provide a tight and secure seal against leaking at the opening 88 during use. Moreover, as described below, portions of the plug 600 can lock the plug 600 in position inside the opening 88 during use and prevent dislocation therefrom unless and until a user of the plug 600 is ready to remove the plug 600 by, e.g., deflating the plug 600.

Figure 3:
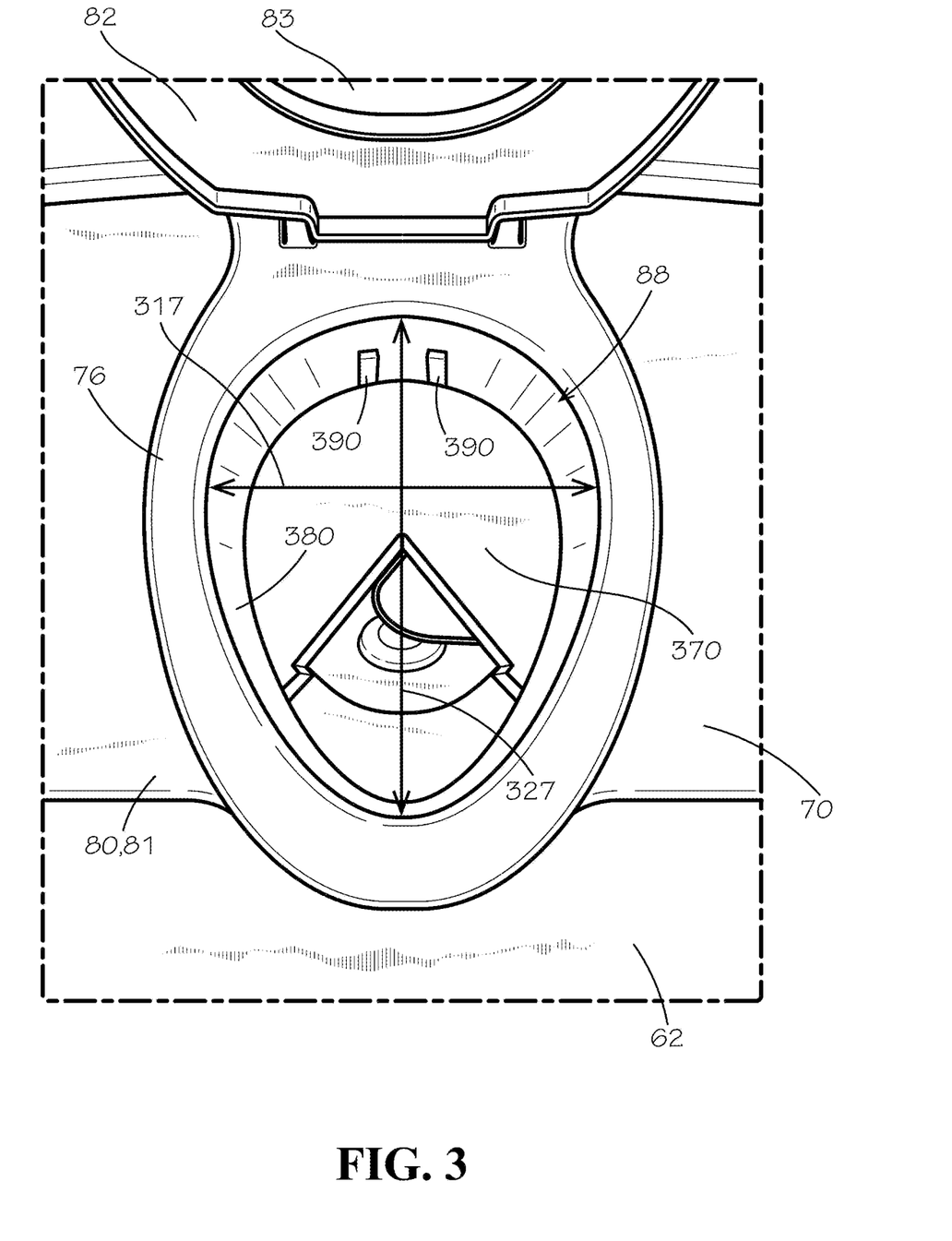
FIG. 3 is a top perspective view of a seat portion defining a main seat opening of the portable toilet of FIG. 1 with a seat rim of the seat in a raised position.

FIG. 3 is a top perspective view of the seat 80 defining the opening 88 of the toilet 50 of FIG. 1 and with the seat rim 82 and the seat cover 83 in a raised position. The seat 80 can comprise a flange 380, which can be a vertical flange, at the opening 88. The tank 70 can comprise a panel 370, which can be positioned below the opening 88. In some aspects, as shown, the opening 88 of the seat 80 can have or can define an elongated shape in which one dimension is greater than another dimension. More specifically, as shown, a dimension or width 327 of the opening 88 in a front-to-back direction can be larger than a dimension or width 317 in a left-to-right direction. In some aspects, for example and without limitation, the width 317 can measure approximately 8 inches to 10 inches and the width 327 can measure approximately 12 inches. In other aspects, however, the dimensions of the opening 88 can be smaller or larger and the dimensions of the plug 600 (shown in FIG. 6A) can be adjusted accordingly. In some aspects, as shown, the opening 88 can be non-circular and, in some aspects, also non-polygonal. In some aspects, as shown, the opening 88 can define one or more protrusions 390, each of which can interrupt an otherwise regular shape of the opening 88 either at the top end 76 of the tank 70 or, as shown, at some point offset in a vertical direction from the top end 76 and along the flange 380.

Figure 4:
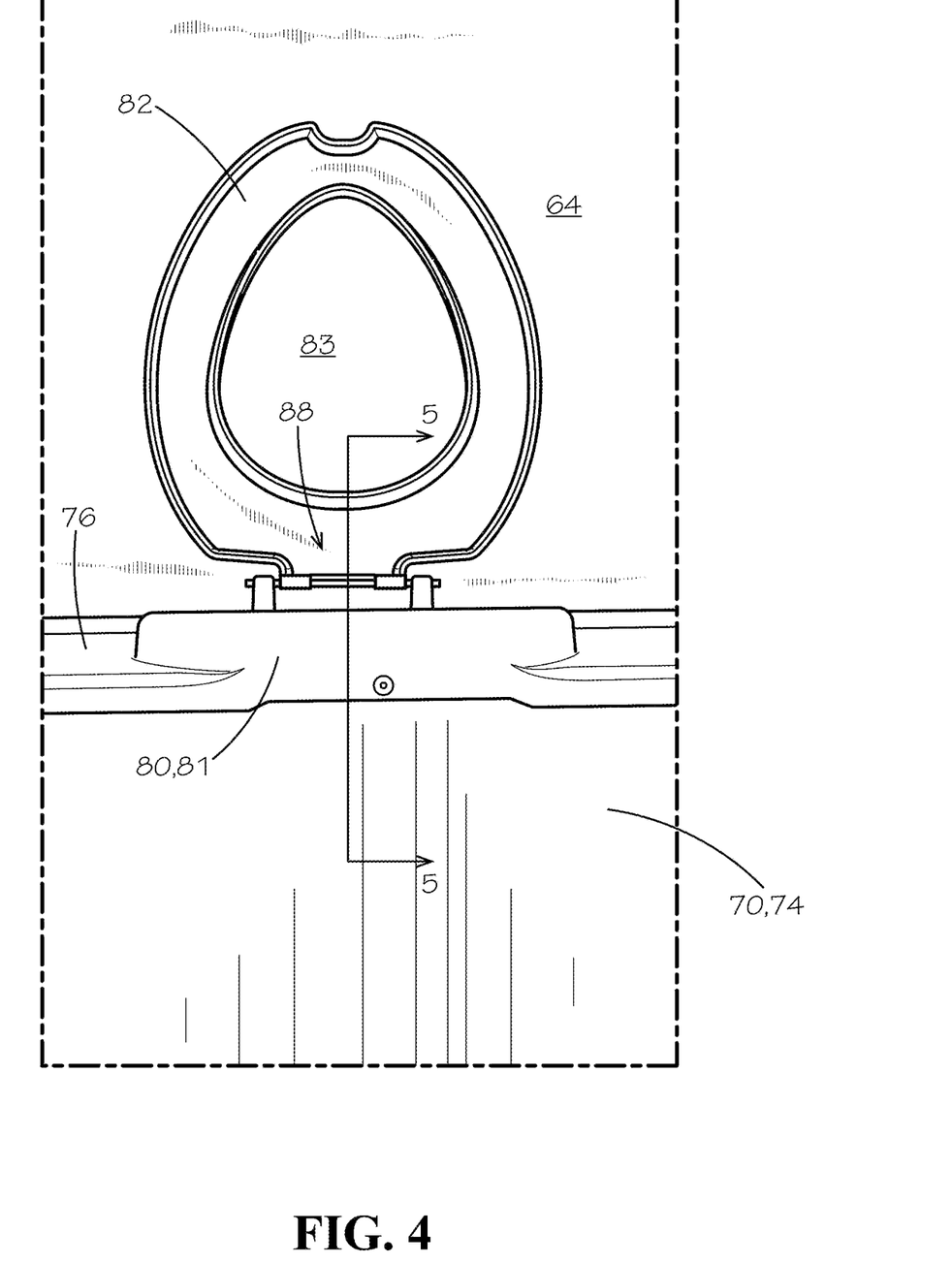
FIG. 4 is a front perspective view of the seat portion of the portable toilet of FIG. 1 taken from detail 4 of FIG. 2.
Figure 5:
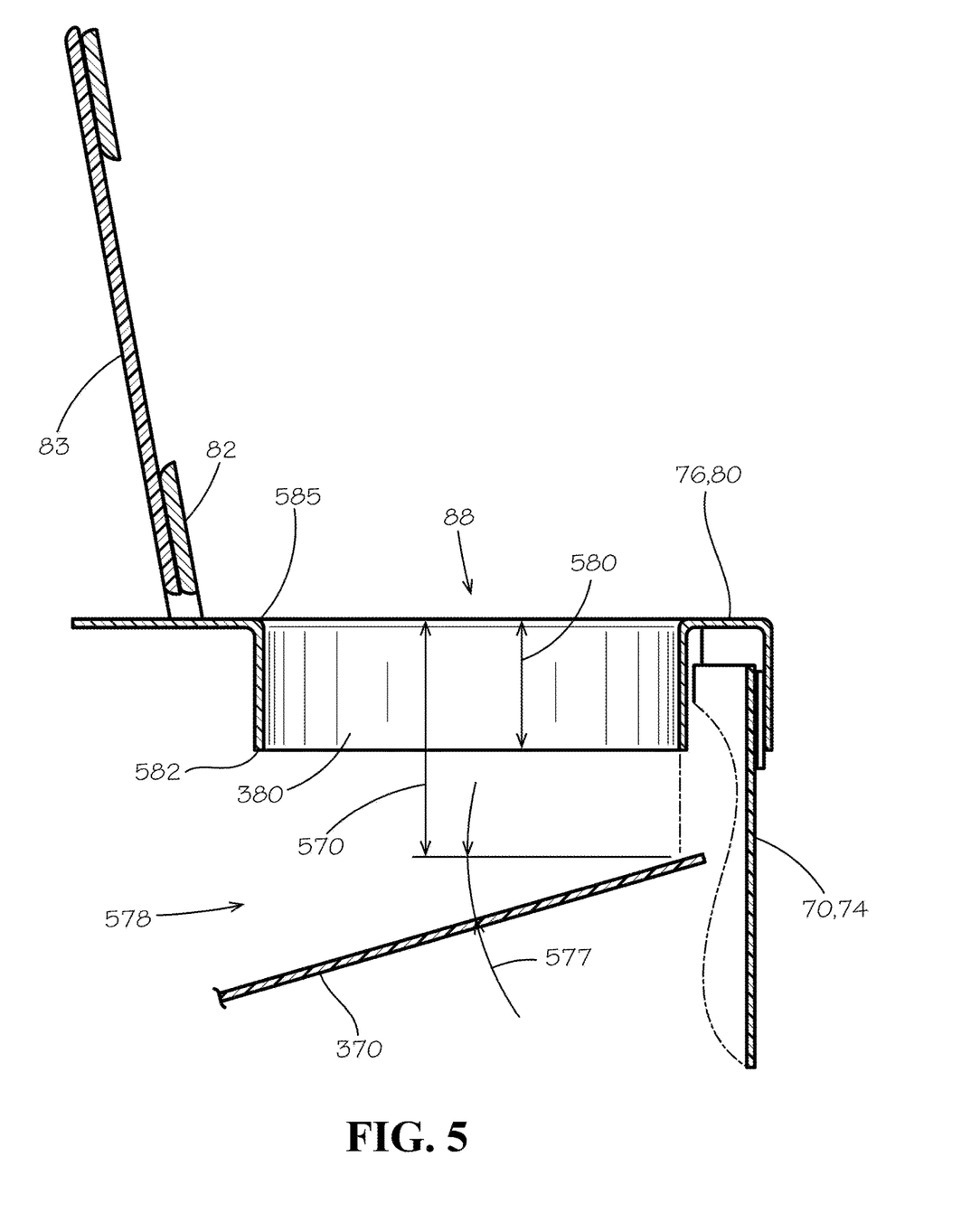
FIG. 5 is a detail sectional view of the seat portion of FIG. 3 taken along line 5-5 of FIG. 4.

FIG. 4 is a front perspective view of the seat 80 of the toilet 50 of FIG. 1 taken from detail 4 of FIG. 2, and FIG. 5 is a detail sectional view of the seat 80 of FIG. 3 taken along line 5-5 of FIG. 4. As shown in FIG. 5, the flange 380 can define a height 580 measured from a first end, top end, or entrance 585 and can terminate inside a cavity 578 formed by the tank 70 and, more specifically, the one or more side walls 74 thereof. More specifically, the flange 380 can terminate in a plain edge 582, which need not be accompanied by any additional geometry (including, e.g., flanges extending from or behind and optionally angled with respect to the flange 380) and, in some aspects to facilitate manufacturability, does not include such additional geometry. The panel 370 can, at a portion closest to the flange 380, be positioned in a vertical direction a distance 570 away from the top end 76 proximate to the opening 88 defined in the seat 80. As shown, the panel can be angled at an angle 577 with respect to the horizontal or with respect to the top end 76 of the tank 70 and, more specifically, the seat 80. The panel 370 need not be straight as shown and in some aspects need not be present. Furthermore, the geometry is not shown to scale.

Figure 6A:
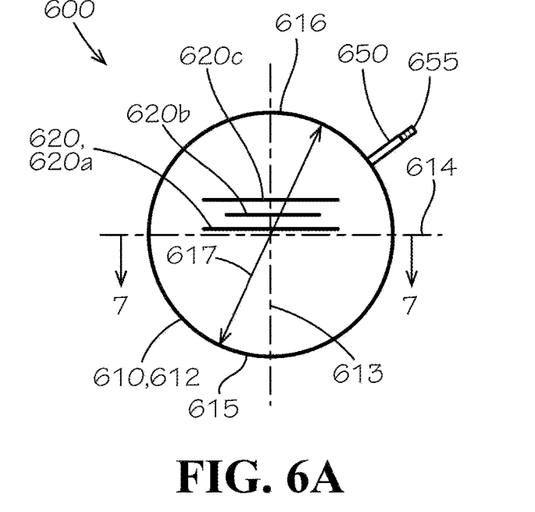
FIG. 6A is a front elevation view of a toilet plug in an inflated condition, the toilet plug defining a spherical shape.

As shown in FIGS. 6A-6D, the body 610 can have or can define any one of a variety of shapes and, as noted above, can be sized to be received within and seal the opening 88 of the toilet 50. In some aspects, as shown in FIG. 6A, the plug 600 can define a spherical shape defining an overall diameter 617.

FIG. 6A is a front elevation view of the toilet plug 600 in an inflated condition. The plug 600, which can be a device for sealably plugging the opening 88 (shown in FIG. 3) of the toilet 50 (shown in FIG. 2), can comprise an inflatable body 610 and a valve 650. The body 610, which can define an inner surface 611 (shown in FIG. 7A) and an outer surface 612, can comprise or be formed from an elastic material. In some aspects, the material can be recyclable or biodegradable. The material forming the body 610 can comprise, for example and without limitation, a vinyl or rubber material. The body 610, which can further define a first or bottom end 615 and a second or top end 616, or a portion thereof can be sized to be received within and seal the opening 88 of the toilet 50 against leaking from the tank 70 (shown in FIG. 2). When formed from the elastic material, the body 610 can stretch or expand to fill and seal against the opening 88 upon inflation. In some aspects, even when the body 610 is not formed from an elastic material, the body 610 can sufficiently seal the opening 88 by expanding as a whole to fill and seal against the opening 88 upon inflation.

The body 610 can define or can comprise one or more marks 620 such as the alignment marks 620a,b,c, which can facilitate a positioning and/or an orientation of the toilet plug 600 inside the opening 88 of the toilet 50 and, more specifically, alignment of the toilet plug 600 with a portion of the opening 88 such as, for example and without limitation, the entrance 585 (shown in FIG. 5) thereof. In some aspects, as shown, the one or more marks 620 can extend partly around the body 610. In some aspects, the one or more marks 620 can extend completely around the body 610. In some aspects, as shown, the one or more marks 620 can vary in length. In some aspects, the one or more marks 620 can have equal lengths. The one or more marks 620 can be either aligned with or offset from a vertical centerline or axis 613 of the body 610 of the plug 600. The one or more marks 620 can be either aligned with or offset from a horizontal centerline or axis 614 of the body 610 of the plug 600. When the plug 600 defines or comprises more than one mark 620, the marks 620 can be offset from each other. The marks 620 can be formed or defined in a color that contrasts with a color of the plug 600 (a light-colored mark 620 on a dark-colored body 610, for example, or a dark-colored mark 620 on a light-colored body 610).

Figure 8A:
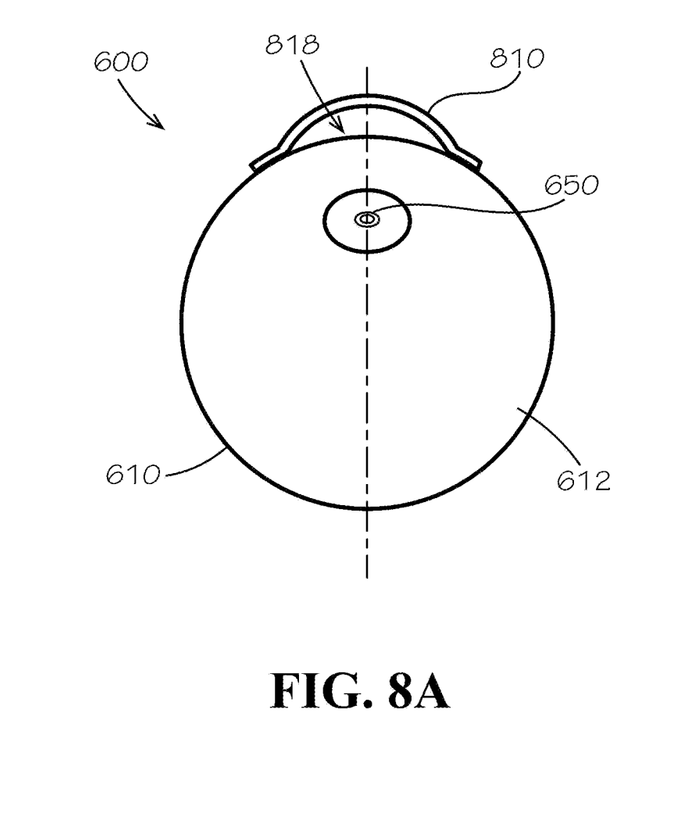
FIG. 8A is a side elevation view of the toilet plug of FIG. 6A in the inflated condition, the toilet plug further comprising a handle in accordance with one aspect of the current disclosure.
Figure 8B:
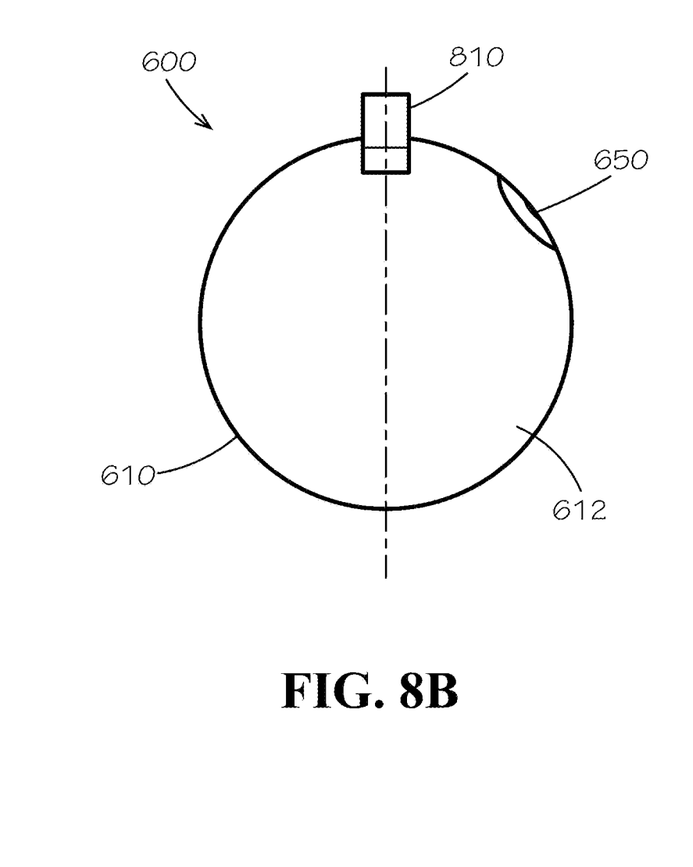
FIG. 8B is a front elevation view of the toilet plug of FIG. 8A in the inflated condition.

In some aspects, as shown, the valve 650 can protrude from the outer surface 612 of the body 610. The valve 650 can be secured to and can define a hole in the body 610 and can be configured for inflation and deflation of the plug 600 by addition and removal of a gas therethrough. In some aspects, as shown in FIGS. 8A and 8B, the valve 650 need not protrude from the outer surface 612. The valve 650 can be placed as desired on or in the body 610, but placing the valve 650 proximate to the top end 616 of the body 610 can facilitate inflation and deflation of the body 610 when the plug 600 is positioned inside the opening 88. In some aspects, the valve 650 can be or can comprise a threaded connection or threaded portion 655. More specifically, the valve 650 can be or can comprise an industry-standard threaded valve structure such as, for example and without limitation, a Schrader valve or a Presta valve and can comprise a self-closing structure. In other aspects, the valve 650 need not comprise any threaded connection—or the connection need not be threaded—and need not protrude from the body 610 and can comprise the kind of valve used in sports equipment such as, for example and without limitation, a soccer ball. In some aspects, the valve 650 can comprise a flap and/or a plug such as the kind of valve used in inflatable tubes and floats. Using such a valve, the flap can be dislodged and air allowed to enter or exit the plug 600 by squeezing the valve 650 or inserting an object to move the flap. In some aspects, the body can be inflated with a needle. In some aspects, using a valve with a threaded connection or at least a valve with a larger internal passage for airflow into and out of the body 610 can facilitate more rapid deflation and inflation of the body 610. The valve 650 can be configured to maintain air inside the body 610 except when the valve 650 is caused to open to release air inside. The body 610 can be filed with a fluid and, more specifically, a gas. For example and without limitation, the body 610 can be filled or inflated with compressed air.

Figure 6B:
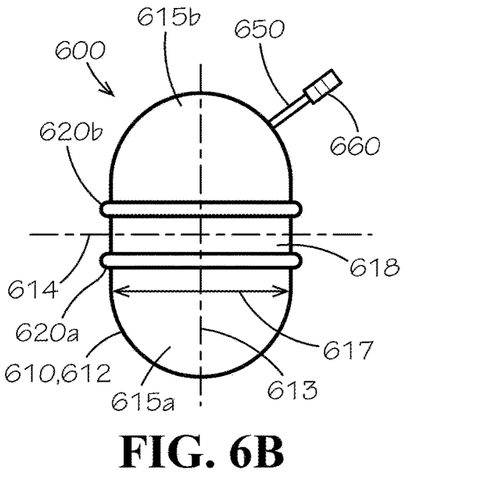
FIG. 6B is a front elevation view of a toilet plug in an inflated condition and in accordance with another aspect of the current disclosure, the toilet plug defining a capsule shape and comprising a pair of alignment ribs or rib-shaped marks.

As shown in FIG. 6B, a front elevation view of the plug 600 in an inflated condition and in accordance with another aspect of the current disclosure, the body 610 can define a capsule or spherocylinder shape, which can comprise two partially spherical or bulbous portions 615a,b joined by a cylindrical portion 618. Each of the two portions 615a,b, which can be hemispherical portions as shown, and the cylindrical portion 618 can separately define the overall diameter 617. As shown, one or both of the marks 620a,b can protrude from the surrounding outer surface 612 of the body 610, and each of the marks 620a,b can comprise a rib. The rib-shaped mark 620a,b can provide a tactile indication of the location of the marks 620a,b. More specifically, when the plug 600 is sufficiently inflated, a mark such as the mark 620b can catch or rest on the entrance 585 (shown in FIG. 5) of the opening 88 (shown in FIG. 2) and a mark such as the mark 620b can catch on the edge 582 (shown in FIG. 5) of the flange 380 (shown in FIG. 5). In some aspects, the mark(s) 620 can protrude from the surrounding outer surface 612 of the body 610 at one or more specific locations around the body 610 and not extend completely around. For example, the mark(s) 620 can comprise a raised bump at one or more locations around the body 610. In some aspects, one or more of the marks 620 can protrude from an immediately surrounding portion of the outer surface 612 of the body 610. More specifically, a distance in a radial direction, with respect to the vertical axis 613 of the body 610, to a radially outermost portion of the alignment mark 610 can be greater than a distance in a radial direction, with respect to the vertical axis 613 of the body 610, to the immediately surrounding portion.

The plug 600 can comprise a quick-connect fitting 660, which can be attached to the valve 650 for rapid inflation and deflation of the inflatable body 610. Instead of engaging a threaded portion of an air pump (not shown) with the threaded portion 655 (shown in FIG. 6A) of the valve 650 by threading the two threaded portions together, for example, a quick connect fitting or adaptor on the air pump can quickly engage the quick-connect fitting 660 by a simple push or snap connection. A system comprising the plug 600 can comprise a motorized air pump for rapid inflation and deflation of the inflatable body 610. In some aspects, the air pump can be reversible or can otherwise operate as a vacuum to draw air from the plug 600.

Figure 6C:
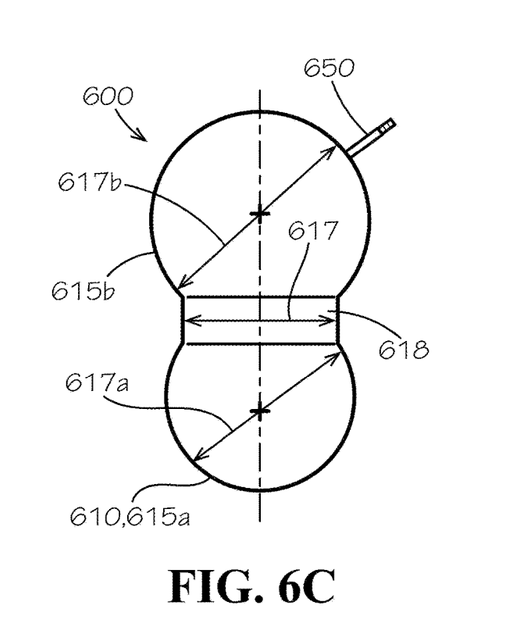
FIG. 6C is a front elevation view of a toilet plug in an inflated condition and in accordance with another aspect of the current disclosure, the toilet plug defining two bulbous portions and a cylindrical portion therebetween.

As shown in FIG. 6C, a front elevation view of the toilet plug 600 in an inflated condition and in accordance with another aspect of the current disclosure, the plug 600 can define the two partially spherical or bulbous portions 615a,b and a smaller-diameter cylindrical portion 618 therebetween. The bulbous portions 615a,b can define overall diameters 617a,b, which can be larger than the diameter 617 defined by the cylindrical portion 618. In some aspects, the plug 600 can define a "dog bone" shape. As the diameters 617a,b approach the diameter 617, the shape of the body 610 can approach the capsule shape shown in FIG. 6B.

Figure 6D:
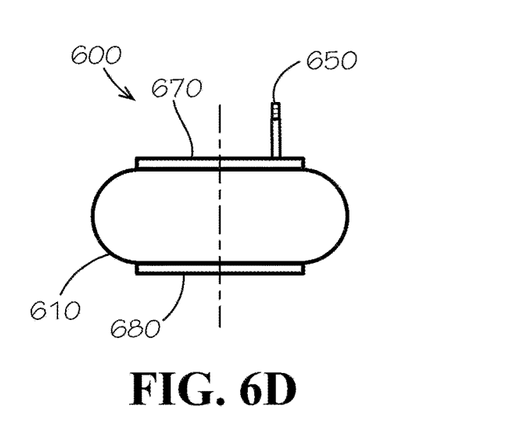
FIG. 6D is a front elevation view of a toilet plug in an inflated condition and in accordance with another aspect of the current disclosure, the toilet plug comprising a disc-shaped portion sandwiched between a top plate and a bottom plate.

As shown in FIG. 6D, a front elevation view of the plug 600 in the inflated condition and in accordance with another aspect of the current disclosure, the body 610 can comprise a disc-shaped portion or can be shaped like a disc. In some aspects, as shown, the plug 600 can comprise a top plate 670 and/or a bottom plate 680, each of which can be formed from a rigid material such as, for example and without limitation, a metal, plastic, or composite material. The valve 650 can be secured to and extend through the body 610 or can be secured to and extend through a plate such as the top plate 670. The disc shape of the body 610 can reduce the amount of gas needed to inflate the body 610 and therefore generally also the time needed to inflate the body 610. Plates such as the top plate 670 and the bottom plate 680 can help maintain the disc shape of the plug 600 and the outward pressure exerted by the body 610 of the plug 600 upon installation and expansion inside the opening 88 (shown in FIG. 2) of the toilet 50 (shown in FIG. 1). Using an inflatable body 610 defining a smaller interior volume, the inflatable body 610 can be filled with less air. In some aspects, the top plate 670 or the bottom plate 680 can be, in one or more orientations or directions, larger than a dimension of the opening 88 and therefore can prevent passage of the plug 600 through the opening 88.

Figure 7A:
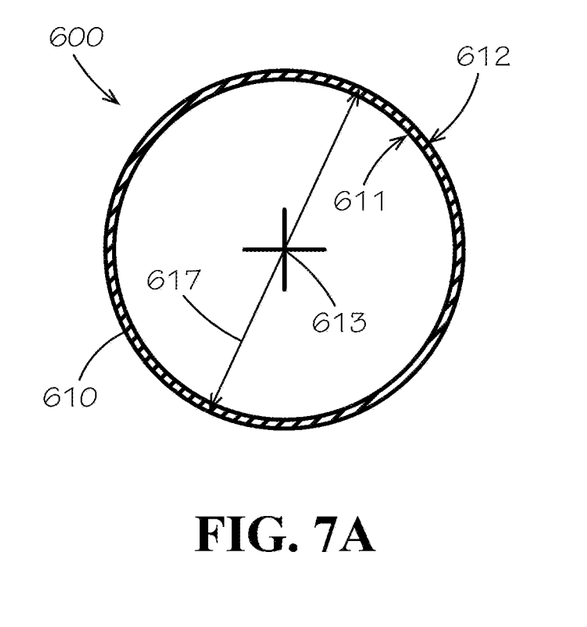
FIG. 7A is a sectional view of the toilet plug of FIG. 6A taken along line 7-7 of FIG. 6A in accordance with one aspect of the current disclosure.
Figure 7B:
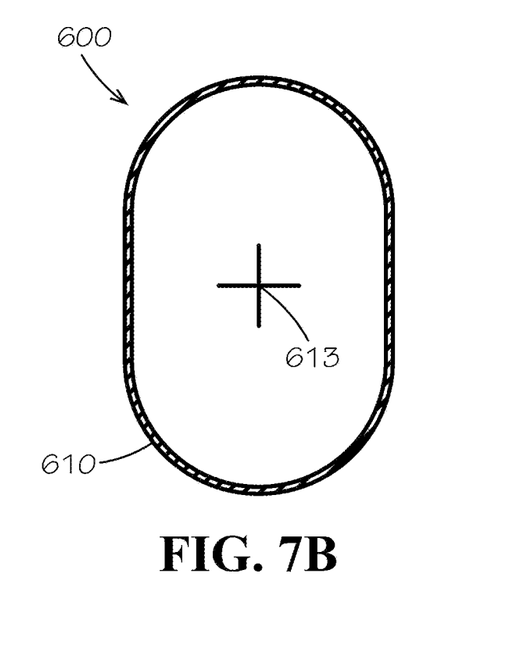
FIG. 7B is a sectional view of the toilet plug of FIG. 6A taken along line 7-7 of FIG. 6A in accordance with another aspect of the current disclosure.
Figure 7C:
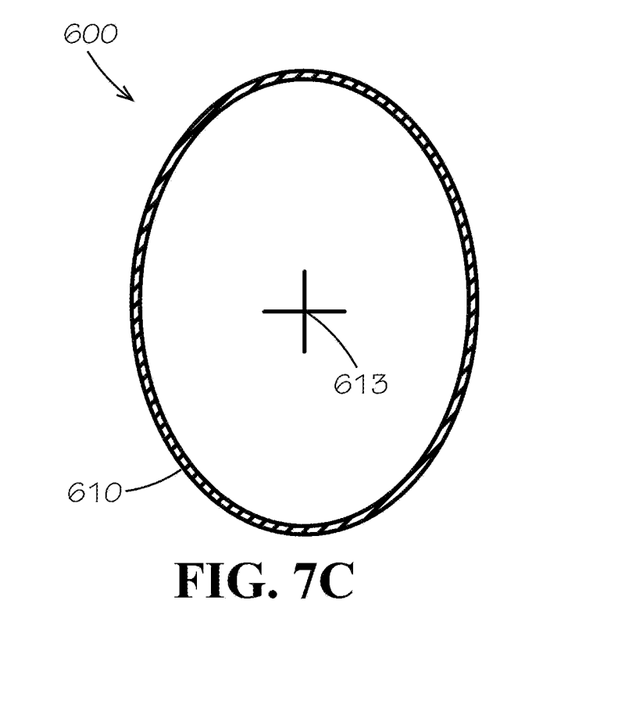
FIG. 7C is a sectional view of the toilet plug of FIG. 6A taken along line 7-7 of FIG. 6A in accordance with another aspect of the current disclosure.
Figure 8C:
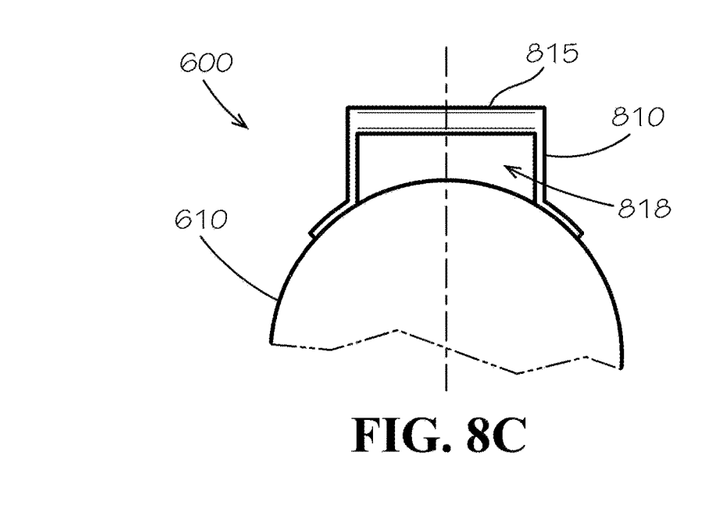
FIG. 8C is a side elevation view of the toilet plug of FIG. 6C in the inflated condition, the toilet plug further comprising a handle in accordance with another aspect of the current disclosure.
Figure 8D:
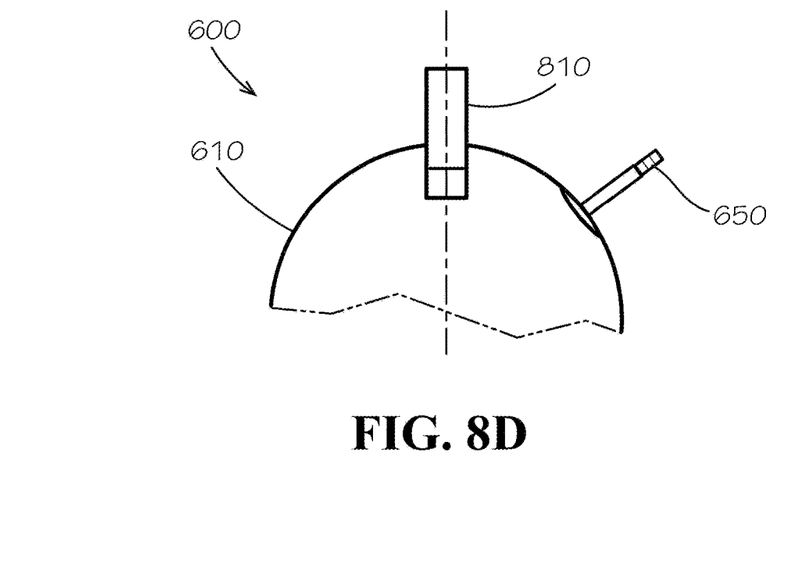
FIG. 8D is a front elevation view of the toilet plug of FIG. 8C in the inflated condition.
Figure 8E:
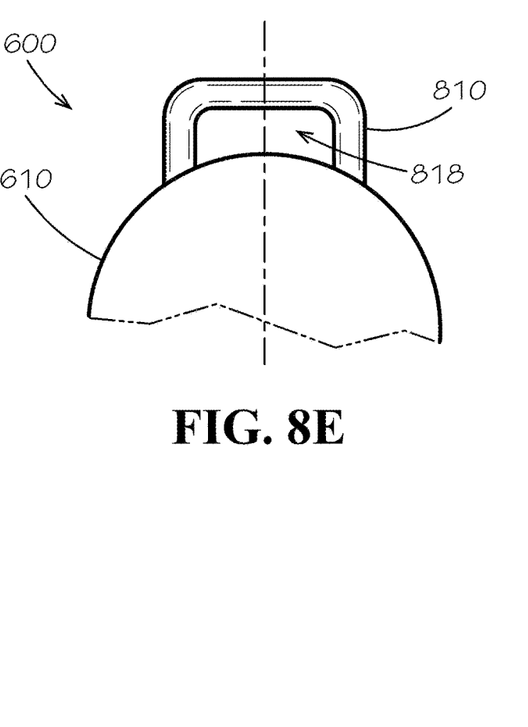
FIG. 8E is a side elevation view of the toilet plug of FIG. 6C in the inflated condition, the toilet plug further comprising a handle in accordance with another aspect of the current disclosure.

As shown also in the sectional views of FIGS. 7A-7C, the body 610 can have or can define any one of a variety of shapes, at least when partially or fully inflated. FIG. 7A is a sectional view of the spherical plug 600 of FIG. 6A taken along line 7-7 of FIG. 6A in accordance with one aspect of the current disclosure. As shown in FIGS. 7B and 7C, sectional views of the plug 600 of FIG. 6A taken along line 7-7 of FIG. 6A in accordance with other aspects of the current disclosure, the body 610 can define an elongated shape or, more specifically as shown in FIG. 7C, an elliptical shape. In some aspects, it is not necessary for the plug 600 to define an elongated shape to sealably engage an elongated opening 88 (shown in FIG. 3), and it is not necessary for the plug 600 to define an elliptical shape to sealably engage an elliptical opening 88. More specifically, because of the flexibility of the material able to form the plug 600, a plug 600 defining a spherical shape can sealably engage the opening 88 when the opening 88 is not circular, and a plug 600 that defines a non-spherical shape can sealably engage the opening 88 when the opening 88 is circular, As shown in FIGS. 8A-8E, the plug 600 can comprise a handle 810, which can have or can define any one of a variety of shapes. As shown in FIGS. 8A and 8B, respective side and front elevation views of the plug 600 of FIG. 6A in the inflated condition, the handle 810 can be a thin strap secured to the outside surface 612 of the body 610 in accordance with one aspect of the current disclosure. The handle 810 can be a grip handle in that it can allow a user to wrap a hand around the handle 810 and at least partially though a handle opening 818 defined between the handle 810 and the body 610. As shown in FIGS. 8C and 8D, respective side and front elevation views of the plug 600 of FIG. 6C in the inflated condition, the handle 810 can comprise a rounded grip 815 in accordance with another aspect of the current disclosure. As shown in FIG. 8E, a side elevation view of the plug 600 in the inflated condition, the handle 810 can be formed integrally with the body 610 in accordance with another aspect of the current disclosure. In some aspects, the handle 810 can be pressurized or inflated itself when the body 610 is inflated.

Figure 9A:
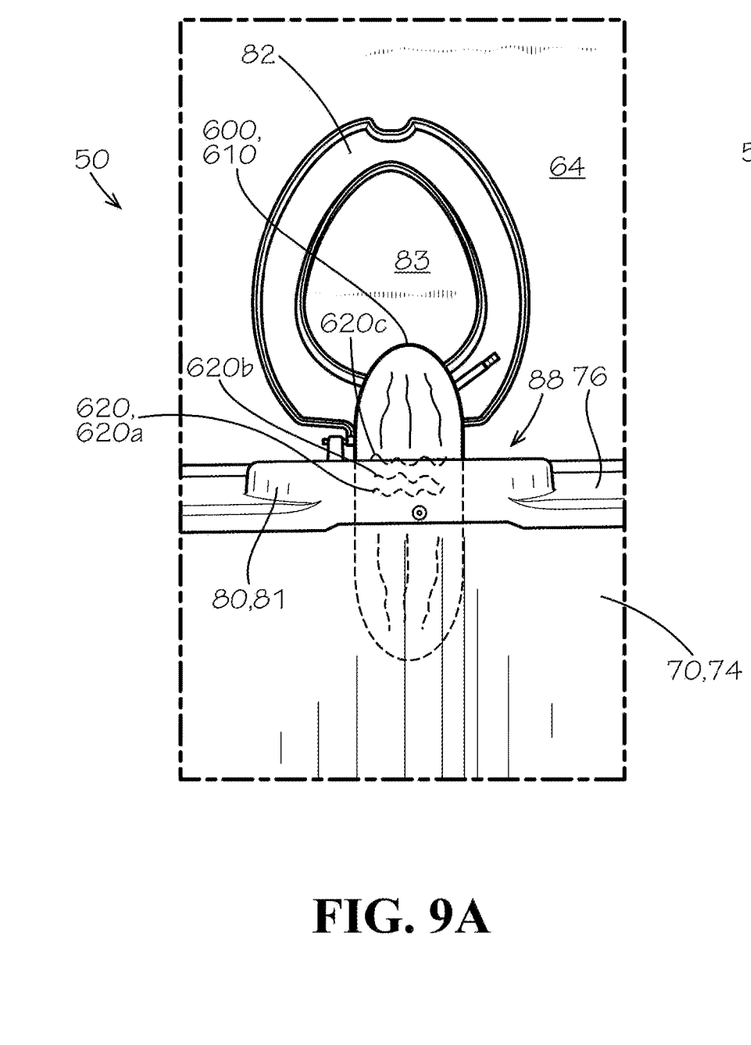
FIG. 9A is a front perspective view of the seat portion of the portable toilet of FIG. 1 taken from detail 4 of FIG. 2 showing also the toilet plug of FIG. 6A in a deflated condition and positioned inside the main seat opening.

FIGS. 9A-9D show the plug 600 during use. FIG. 9A is a front perspective view of the seat 80 of the portable toilet of FIG. 1 taken from detail 4 of FIG. 2 showing also the plug 600 of FIG. 6A in a deflated condition and positioned inside the main seat opening 88 defined in the seat 80. Because the plug 600 is deflated, it can be easily inserted into a range of sizes and shapes of the opening 88. Shown in FIGS. 8A-8E, the handle 810 can facilitate positioning, orientating, and holding of the plug 600 inside the opening 88, including when the plug 600 is less than fully inflated as shown and not sealably and securely positioned inside the opening 88. Even in a deflated condition, a position of the mark 620 or each of the marks 620a,b,c can be visible and can guide positioning of the plug 600.

The body 610, including in an inflated state or condition, or a portion thereof can be sized relative to a size of the opening 88. In some aspects, for example, the diameter 617 (shown in FIG. 6A) or another dimension corresponding to a size of the plug 600 in the inflated condition can measure between 110% and 200% of the corresponding dimension of the opening 88. In other aspects, the diameter 617 or another dimension corresponding to a size of the plug 600 in the inflated condition can measure outside of this range. In some aspects, the diameter 617 or any one of the dimensions 617 or 617a,b (shown in FIG. 6C) can measure between 14 inches and 18 inches. In other aspects, the diameter 617 or any one of the dimensions 617 or 617a,b can measure outside of this range.

Figure 9B:
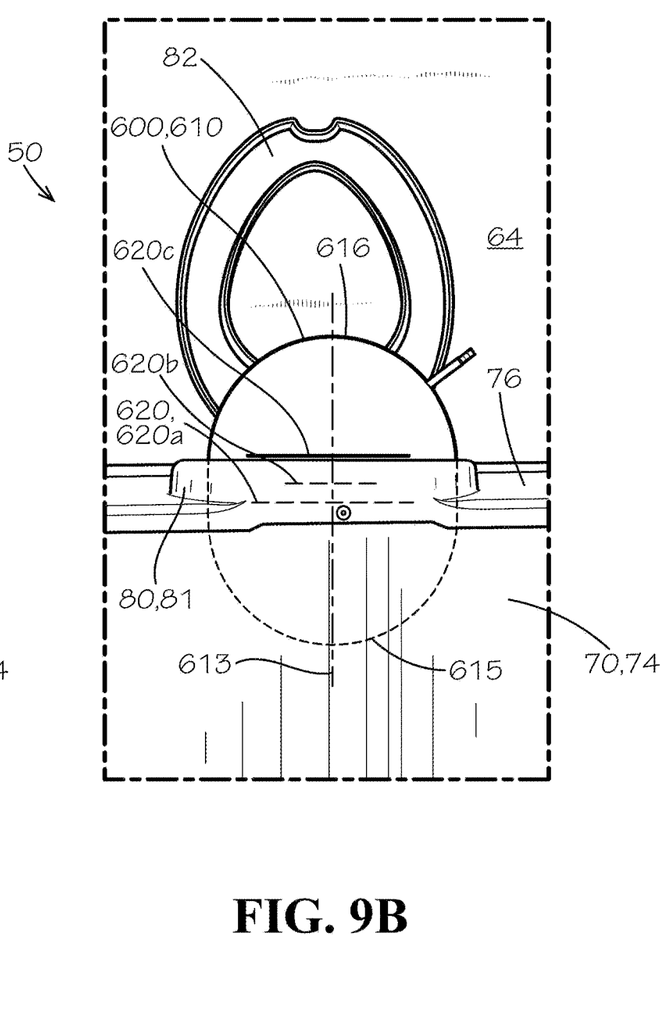
FIG. 9B is a front perspective view of the seat portion of the portable toilet of FIG. 1 taken from detail 4 of FIG. 2 showing also the toilet plug of FIG. 6A in an inflated condition and sealably positioned inside the main seat opening.

FIG. 9B is a front perspective view of the seat 80 of the toilet 50 of FIG. 1 taken from detail 4 of FIG. 2 showing also the plug 600 of FIG. 6A in an inflated condition and sealably positioned inside the opening 88 (shown in FIG. 9A) defined in the seat 80. As described above, the marks 620a,b,c can facilitate a positioning and/or an orientation of the toilet plug 600 inside the opening 88 and, more specifically, alignment of the toilet plug 600 with a portion of the opening 88 such as, for example and without limitation, the entrance 585 (shown in FIG. 5) thereof. For example, the marks 620a,b,c can be positioned such that alignment of any of the marks 620a,b,c or any portion of the plug 600 between the marks 620a,b,c with the entrance 585 of the opening 88 of the seat 80 of the toilet 50 can ensure a sufficient seal and can ensure that the plug 600 is not displaced even during transport of the toilet 50 on rough roads. For example, a user of the plug 600 can position the plug 600 in the opening 88 such that the lower mark 620a is barely visible or hidden and the other two marks 620b,c are visible, or the user can position the plug 600 in the opening 88 such that only the mark 620c is visible among the three marks 620a,b,c or is barely hidden and the other two marks 620a,b are hidden below the entrance 585. The user, in some aspects, can therefore target a position of the plug 600 that leaves only one or two of the marks 620a,b,c fully visible. Again, a single mark 620 can be used for alignment, or the plug 600 can be used without any marks 620.

Through routine experimentation, a particular plug 600 can be easily tested in a range of positions inside the opening and positions of the one or more marks 620 adjusted and even optimized by performing transport tests on an actual truck over varying terrain. In some aspects, such tests can be simulated with a transportation test such as one of the vibration test methods outlined in test standards promulgated by the International Safe Transit Association (ISTA) (and available from ISTA), or ASTM International (and available from ASTM International), with the plug 600 installed in the toilet 50.

Figure 9C:
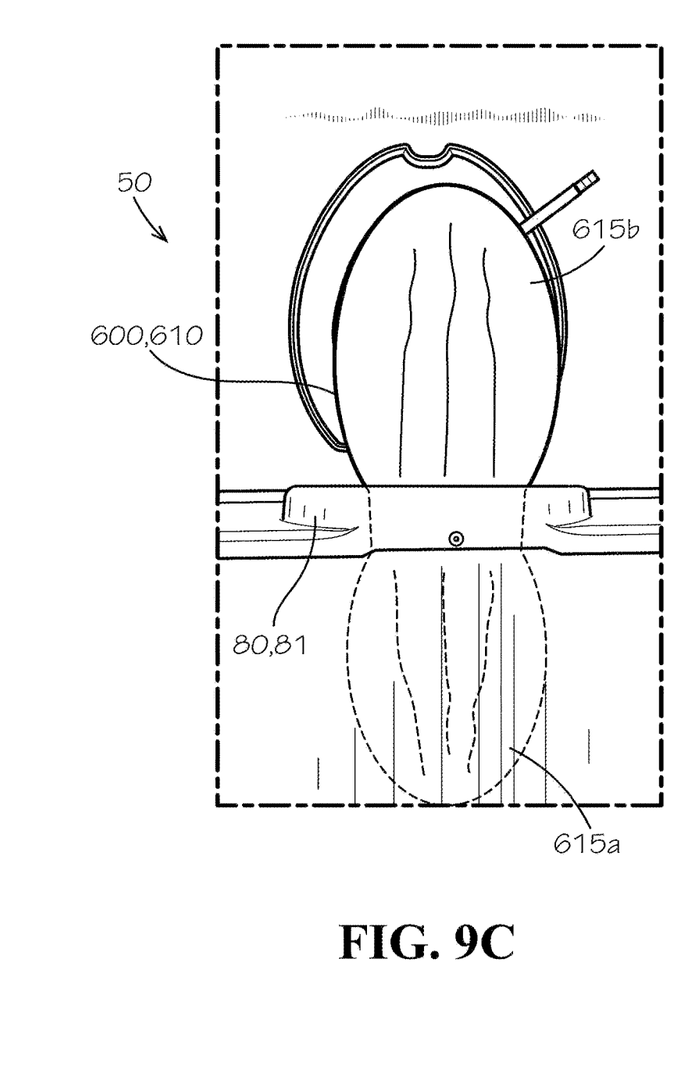
FIG. 9C is a front perspective view of the seat portion of the portable toilet of FIG. 1 taken from detail 4 of FIG. 2 showing also the toilet plug of FIG. 6C in a deflated condition positioned inside the main seat opening.
Figure 9D:
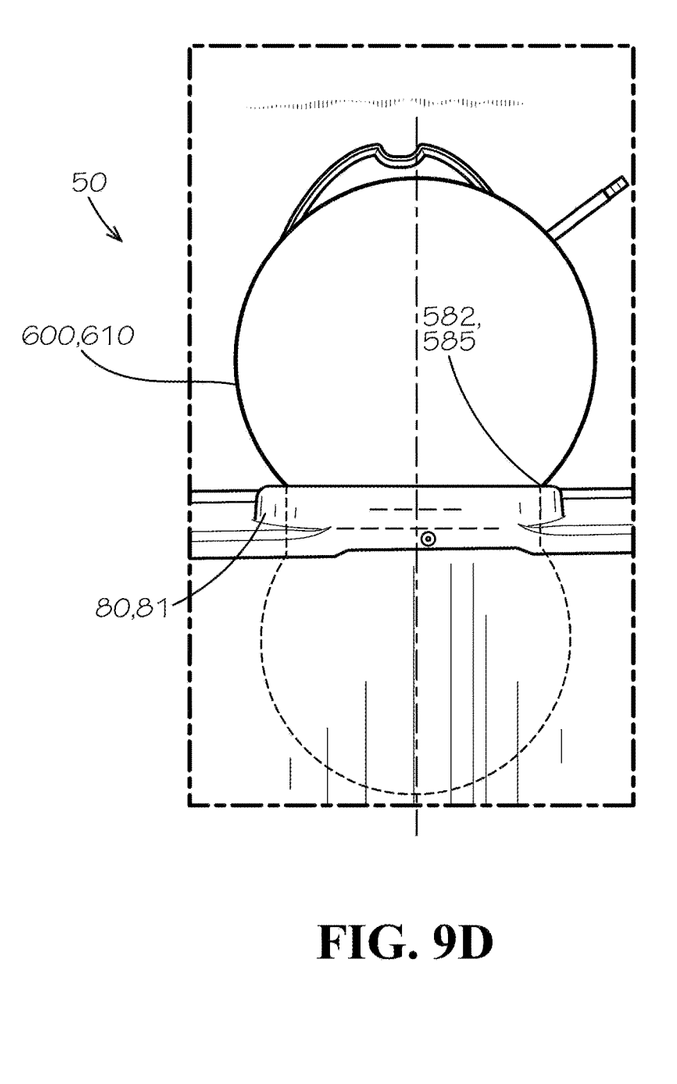
FIG. 9D is a front perspective view of the seat portion of the portable toilet of FIG. 1 taken from detail 4 of FIG. 2 showing also the toilet plug of FIG. 6C in an inflated condition and sealably positioned inside the main seat opening.

FIGS. 9C and 9D are front perspective views of the seat 80 of the toilet 50 of FIG. 1 taken from detail 4 of FIG. 2 showing the plug 600 of FIG. 6C in a deflated and inflated conditions, respectively, positioned inside the opening 88 (shown in FIG. 9A). Shown also sealably positioned inside the opening 88 in FIG. 9D, the bulbous portions 615a,b can lock the plug 600 in the opening 88 by becoming too large to pass through the opening 88 in either direction (i.e., either up or down). Even if the plug 600 does not comprise or define a bulbous portion such as one or more of the bulbous portions 615a,b in a deflated condition, in an inflated condition the plug 600 can similarly lock in the opening 88 by portions of the inflated body 610 becoming too large to pass through or become dislocated from the opening 88. As described above, forming the body 610 from an elastic material can facilitate such locking of the plug 600 inside an opening of the toilet 50 such as the opening 88.

A method of using the plug 600 can comprise inserting the body 610 into the opening 88 of the toilet 50. The method can comprise inflating the body 610 through the valve 650, which can be secured to and define a hole in the body 610. In some aspects, inflating the plug 600 can comprise engaging with the valve 650 a needle (not shown) that is in fluid communication with the air pump. In some aspects, inflating the plug 600 can comprise engaging the valve 650 with the air pump by engaging a threaded portion of the air pump with a threaded portion of the valve 650. In some aspects, inflating the plug 600 can comprise using the quick-connect fitting 660 and/or a motorized pump. The method can comprise aligning the one or more marks 620 with a portion of the toilet 50. The method can comprise engaging the plug 600 with the opening 88. More specifically, the method can comprise pushing against the flange 380 of the toilet 50 with the outer surface 612 of the plug 600 when the plug 600 is pressurized. In some aspects, pushing against the flange 380 of the toilet 50 with the outer surface 612 of the plug 600 can comprise pushing against the flange 380 of the toilet 50 with the outer surface 612 across the full height 580 of the flange 380. As clearly shown in FIGS. 9C and 9D and as would be more visible in FIGS. 9A and 9B with greater inflation of the plug 600, the method can comprise engaging or, in some aspects, wrapping around the entrance 585 and/or the edge 582 such that a diameter or width of the plug in a certain direction is greater than a corresponding dimension or width of the opening 88 of the toilet 50 in the same direction. In some aspects, one or both of the marks 620a,b (shown in FIG. 6B) can define an overall diameter or other dimension that is greater than a corresponding dimension of the opening 88, and the plug 600 can thereby be secured or fixed in place vertically with respect to the seat 80. In some aspects, a frictional force resulting from the engagement of the plug 600 with the flange 380 or other structure of the opening 88 is sufficient to maintain a position of the plug 600. In any case, the method can comprise transporting the toilet 50 with the toilet 50 in a filled condition, which can be a partially filled or completely filled condition. More specifically, in a filled condition, the toilet 50 can contain at least one of a disinfectant "charge" and a waste material. The method can comprise deflating the plug 600. Deflating the plug 600 can comprise using the quick-connect fitting 660 and/or a motorized vacuum or otherwise using similar steps as used when inflating the plug 600. The method can comprise removing the body 610 from the opening 88. The method can comprise cleaning the plug 600 to remove any solids or liquids therefrom. In some aspects, the method can comprise discarding and/or recycling the plug 600 after a single use or after a certain number of uses.

A method of manufacturing the plug 600 can comprise forming the body 610 through any desirable process including, for example and without limitation, a molding process. The method can comprise securing the valve 650 to the body 610. The method can comprise securing the handle 810 to the body 610. The method can comprise forming marks 620 in or applying the marks 620 to the outer surface 612 of the plug 600.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A system comprising:
   a portable toilet comprising an enclosure and a door configured to selectably provide and restrict access to an interior of the enclosure, the portable toilet being a chemical toilet, the portable toilet further comprising a bottom panel configured to facilitate transport of the portable toilet, the portable toilet defining an opening inside the enclosure, the opening configured to receive waste from a user;
   an inflatable body comprising a single wall formed from an elastic material extending from an inner surface of the device to an outer surface of the device, the body received within and sealably positioned inside the opening of the portable toilet; and
   a valve secured to the body and in fluid communication with a hole in the body, the valve configured to facilitate inflation and deflation of the body.

2. The system of claim 1, wherein the body is configured to sealable engage the opening when the opening is any one of multiple shapes including at least a circular shape and a non-circular shape.

3. The system of claim 1, wherein a mark defined in the body is aligned with a portion of the portable toilet when the body is in a securably engaged position with respect to the portable toilet.

4. A method of using a toilet plug, the method comprising:
inserting an inflatable body of the toilet plug into an opening of a portable toilet, the portable toilet being a chemical toilet, the portable toilet further comprising an enclosure and a door configured to selectably provide and restrict access to an interior of the enclosure, the portable toilet comprising a bottom panel configured to facilitate transport of the portable toilet;
inflating the body through a valve of the toilet plug;
sealably engaging the opening with the plug; and
transporting the portable toilet with the portable toilet in a non-empty condition.

5. The method of claim 4, further comprising:
deflating the body; and
removing the body from the portable toilet.

6. The method of claim 4, wherein in the non-empty condition the portable toilet contains at least one of a disinfectant "charge" and a waste material.

7. The method of claim 4, wherein the toilet plug further comprises a valve, and wherein inflating the body comprises inflating the body through the valve, the valve defining a hole in the body.

8. The method of claim 4, wherein sealably engaging the plug with the opening pushing against a surface of the portable toilet defining the opening with an outer surface of the plug when the plug is inflated.

9. The method of claim 4, further comprising aligning at least one mark defined in the body with a portion of the portable toilet.

10. The method of claim 4, wherein a diameter or width of the plug in a certain direction is greater than a corresponding dimension or width of the opening of the portable toilet in the same direction.

11. The method of claim 4, wherein the inflatable body comprises a single wall formed from an elastic material extending from an inner surface of the device to an outer surface of the device.

\* \* \* \* \*